(12) United States Patent
Knezevic et al.

(10) Patent No.: US 10,746,249 B2
(45) Date of Patent: Aug. 18, 2020

(54) DAMPING VALVE, IN PARTICULAR FOR A VIBRATION DAMPER

(71) Applicant: ZF Friedrichshafen AG, Friedrichshafen (DE)

(72) Inventors: Aleksandar Knezevic, Eitorf (DE); Jörg Rösseler, Ruppichteroth (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 16/099,561

(22) PCT Filed: Apr. 18, 2017

(86) PCT No.: PCT/EP2017/059087
§ 371 (c)(1),
(2) Date: Nov. 7, 2018

(87) PCT Pub. No.: WO2017/198405
PCT Pub. Date: Nov. 23, 2017

(65) Prior Publication Data
US 2019/0145484 A1 May 16, 2019

(30) Foreign Application Priority Data

May 20, 2016 (DE) .......................... 10 2016 208 779
Jun. 23, 2016 (DE) .......................... 10 2016 211 289

(51) Int. Cl.
*F16F 9/348* (2006.01)
*F16F 9/34* (2006.01)
*F16K 17/04* (2006.01)

(52) U.S. Cl.
CPC ............ *F16F 9/3484* (2013.01); *F16F 9/348* (2013.01); *F16F 9/3415* (2013.01); *F16F 9/3485* (2013.01); *F16K 17/0433* (2013.01); *F16F 2224/025* (2013.01); *F16F 2226/04* (2013.01); *F16F 2226/044* (2013.01); *F16F 2230/00* (2013.01)

(58) Field of Classification Search
CPC ... F16K 17/0433; F16F 9/3484; F16F 9/3415; F16F 9/348; F16F 9/3485; F16F 2224/025; F16F 2230/00
USPC ......................................................... 137/514
See application file for complete search history.

(56) References Cited

U.S. PATENT DOCUMENTS

| 4,531,541 A * | 7/1985 | Hartshorn ........... F04B 39/1033 |
| | | 137/514 |
| 5,921,360 A | 7/1999 | Kargar |
| 2013/0025987 A1 | 1/2013 | Batterbee |
| 2018/0119767 A1 | 5/2018 | Knezevic |

FOREIGN PATENT DOCUMENTS

| DE | 10163217 | 7/2003 |
| DE | 102006031179 | 12/2007 |
| DE | 102010062324 | 6/2012 |
| DE | 102015206022 | 10/2016 |

* cited by examiner

*Primary Examiner* — P. Macade Nichols
(74) *Attorney, Agent, or Firm* — Cozen O'Connor

(57) ABSTRACT

A damping valve includes a damping valve body having at least one throughflow orifice which is at least partially covered by at least one valve disk by the action of a closing force. At least one spring body exerts an opening force on the valve disk that is less than the closing force. The at least one spring body is constructed as an elastomeric body separately from the control edge.

14 Claims, 9 Drawing Sheets

DAMPING VALVE, IN PARTICULAR FOR A
VIBRATION DAMPER

PRIORITY CLAIM

This is a U.S. national stage of application No. PCT/EP2017/059087, filed on Apr. 18, 2017. Priority is claimed on the following applications: Country: Germany, Application No.: 102016208779.7, filed: May 20, 2016; and Country: Germany, Application No.: 102016211289.9, filed Jun. 23, 2016, the content of which is/are incorporated herein in its entirety by reference.

FIELD OF THE INVENTION

The invention is directed to a damping valve, for a vibration damper.

BACKGROUND OF THE INVENTION

A generic damping valve for a vibration damper is known from DE 10 2010 062 324 A1.

A generic damping valve for a vibration damper generally comprises a damping valve body having at least one throughflow orifice for the damping medium and at least one valve disk adapted to the damping valve body. The valve disk at least partially closes the throughflow orifices in the damping valve body by the action of a closing force.

A damping medium flows through the damping valve. The damping medium flows through the throughflow orifices in the damping valve body and presses in opening direction against the valve disk adapted to the damping valve body. If the pressing force of the damping medium exceeds the closing force of the valve disk, the valve disk lifts up from the damping valve body and releases the flow of damping medium through the damping valve.

With a decrease in the pressure of the damping medium, the valve disk which is acted upon by the closing force immediately closes again and at least partially covers the throughflow orifices in the damping valve body.

The immediate closing of the valve disk causes knocking noises which are objectionable. A spring body acting in opening direction, e.g., a star spring, arranged between the valve disk and the damping valve body may be used, for example, to prevent a sudden closing.

The additional star-shaped spring element or spring body complicates the arrangement of flow paths because the ends of the spring connect radially to a central ring.

A damping valve known from DE 10 2006 031 179 B3 has control edges on which the valve disks rest, these control edges being made from an elastomeric material. The control edges are deformed when the damping valve is closed and spring back into their original shape again when the damping valve opens.

The advantage of this solution consists in that the flow paths can run in the same way as in a conventional damping valve. However, a serious disadvantage consists in that leakiness occurs when the control edges become worn, which can cause massive changes in the damping force characteristic and result in total failure of the vibration damper. Further, the spring rate depends on the control edge geometry.

It is thus an object of this invention to provide a damping valve in which at least a reduction in knocking noises is achieved while avoiding the disadvantages known from the prior art.

SUMMARY OF THE INVENTION

This object is met in that the at least one spring body is constructed as an elastomeric body separately from the control edge.

In the simplest embodiment of the present invention, the at least one elastomeric body can be positioned at any location. A barrel-shaped elastomeric body, for example, can be used and arranged in the surface region that is covered by the valve disk in projection. The elastomeric body not only acts as a spring but also exercises a damping function through internal friction.

In a particularly simple configuration, the at least one elastomeric body is directly connected to the damping valve body. For example, the elastomeric body can be buttoned into a blind hole opening or can also be incorporated in an injection molding process.

In a particularly simple configuration of the elastomeric body, the elastomeric body is constructed as a ball. The ball shape offers the advantage that there is no preferred installation position.

A particularly advantageous configuration of the invention provides that the damping valve body has an annular groove defined by two spaced-apart control edges, and the elastomeric body is arranged in the annular groove. This makes particularly good use of the installation space in the damping valve. Further, the opening force is introduced into the valve disk where the closing force and the hydraulic opening force are also operative.

The damping valve body preferably has receiving openings for the at least one elastomeric body. Accordingly, a very simple snap-in connection can easily be realized between the elastomeric body and the damping valve body.

When the damping valve body has a pre-choke disk with pre-choke orifices, the pre-choke disk can support the elastomeric body. This appreciably simplifies mounting of the at least one elastomeric body because the elastomeric body can be assembled outside of the damping valve body.

It can also be provided that a plurality of elastomeric bodies are connected to one another via an elastomeric ring. The elastomeric ring can then simply be placed on the damping valve body and all of the elastomeric bodies are accordingly fitted in one step. The ring can also be constructed as a ring segment extending over an angle of less than 360°.

The elastomeric ring can also have the pre-choke orifices. A separate pre-choke disk can then be dispensed with.

Alternatively, the elastomeric body can be constructed as a tubular body forming the throughflow orifice. In this case, an already existing damping valve body can be used.

The elastomeric bodies have a variable opening force for defining the lift behavior of the valve disk. For example, there is a zone with a greater opening force and a zone with a smaller opening force. Consequently, with comparable closing forces and a hydraulic opening force there is always a defined lift behavior, i.e., one-sided lifting, of the valve disk.

A further possibility can consist in that the elastomeric bodies have a variable spring rate. By varying the spring rate, for example, through different Shore hardnesses, a uniform design can be used for all of the elastomeric bodies. Different colors for different Shore hardnesses facilitate quality control during the fitting of the elastomeric bodies.

Alternatively, the elastomeric bodies can also be arranged asymmetrically along the circumference of the annular groove.

It can also be provided that the elastomeric bodies are arranged on different pitch circles so as to generate a defined closing behavior and opening behavior over the different distances from the valve disk center point.

Further, different pitch circle arrangements offer the possibility for the elastomeric bodies to form an oblique plane on which the valve disk is supported.

BRIEF DESCRIPTION OF THE DRAWINGS

The invention will be described in more detail referring to the following description of the figures, in which.

DETAILED DESCRIPTION OF THE PRESENTLY PREFERRED EMBODIMENTS

Figure 1:
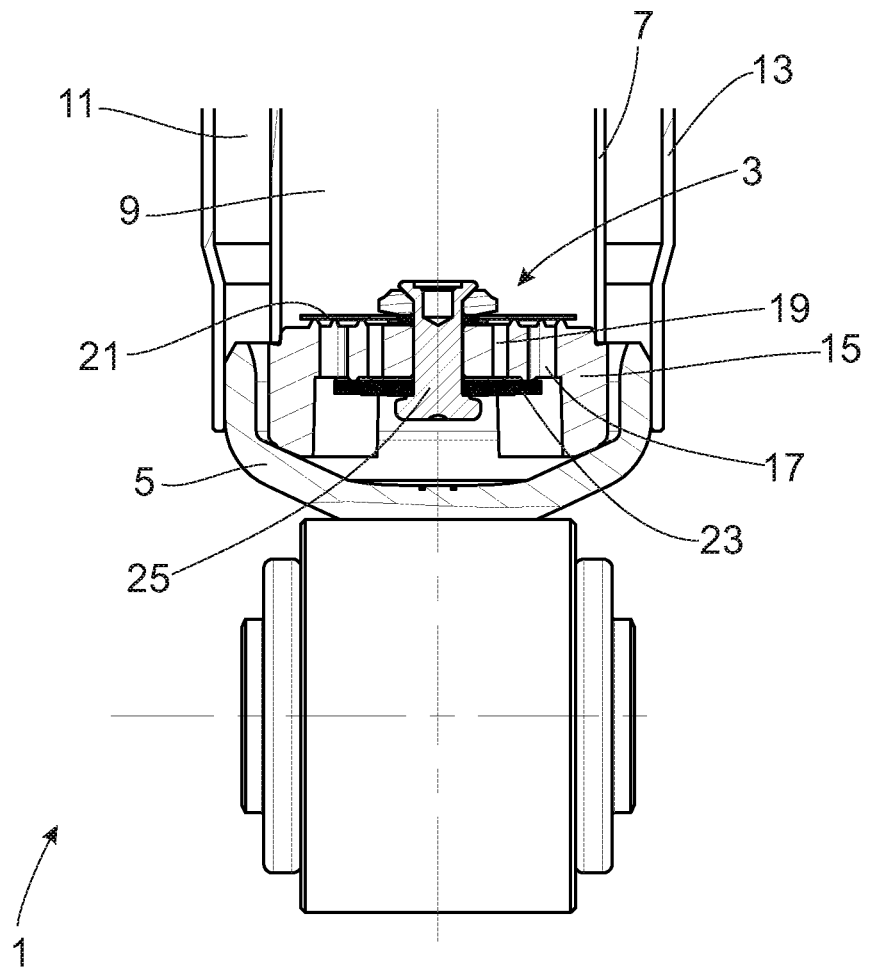
FIG. 1 shows a partial sectional view of a damping valve of the prior art.

FIG. 1 shows a section of a vibration damper 1 in the area of a damping valve 3 which is operatively arranged between a working chamber 9 and a compensation space 11 at a base 5 of a cylinder 7. The compensation space is limited by an outer receptacle 13. In principle, the damping valve could also be placed at a piston rod or at any other location.

The damping valve 3 comprises a damping valve body 15 with at least one throughflow orifice 17; 19 which is at least partially covered by at least one valve disk 21; 23 under the action of a closing force. The closing force can be achieved by a spring of any type of construction or by a preloading of the valve disk 17; 19. In the present embodiment, the valve disk is preloaded via a fastening element 25 acting centrally on a valve seat surface.

As can be further appreciated from FIG. 1, the damping valve 3 has two throughflow directions with separate throughflow orifices on different pitch circles. The throughflow orifices 19 on the smaller pitch circle diameter with valve disks 23 at the underside of the damping valve body 15 provide for the flow through the damping valve proceeding from working chamber 9 into compensation space 11. Throughflow orifices 17 on the outer pitch circle and on the at least one valve disk 21 on the upper side of the damping valve provide for a return flow from compensation space 11 into working chamber 9.

Figure 2:
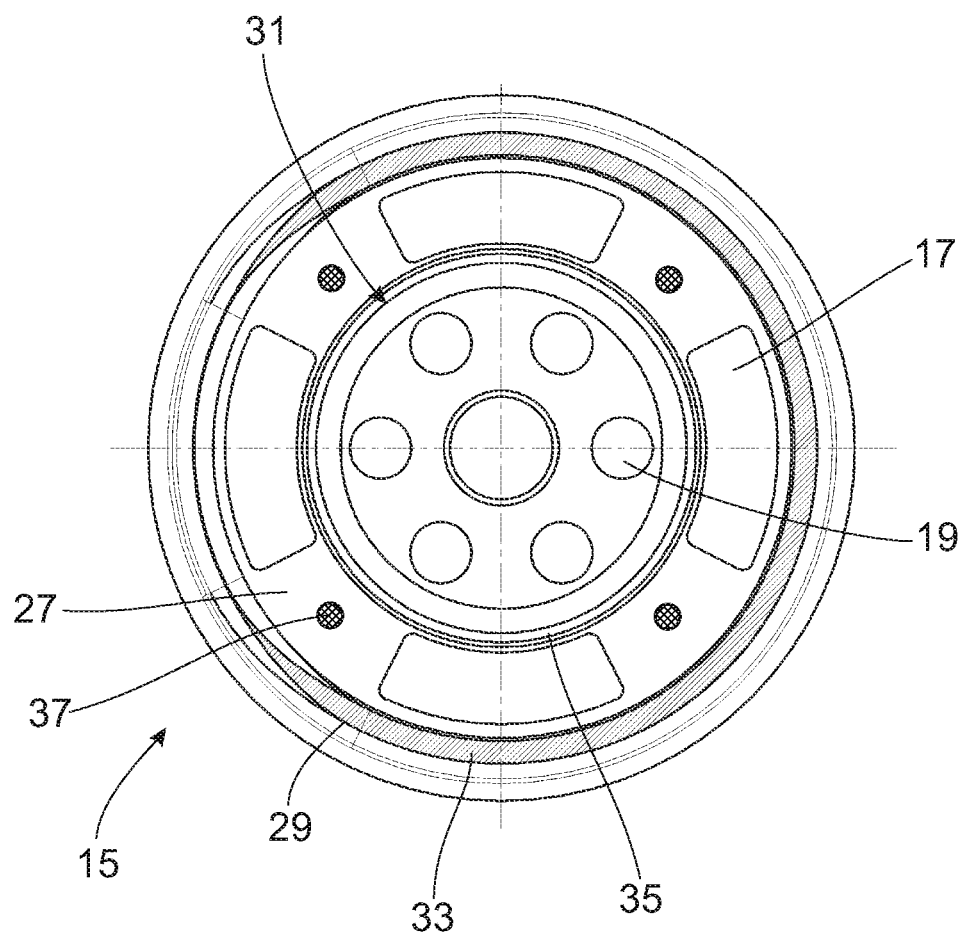
FIG. 2 is a top view of a damping valve according to the present invention.
Figure 3:
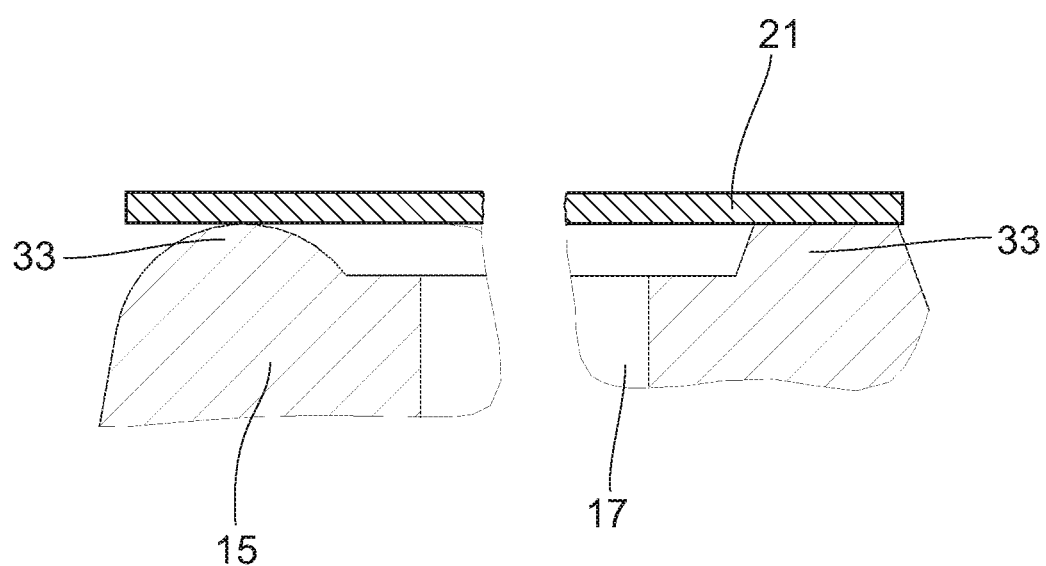
FIG. 3 is a detailed sectional view of the valve seat surface of the damping valve shown in FIG. 2.

FIG. 2 shows a top view of the damping valve body 15 viewed from the direction of the working chamber 9. Throughflow orifices 17; 19 for the two throughflow directions are arranged in each instance in an annular groove 27 which is limited by an outer control edge 29 and an inner control edge 31. The control edges define valve seat surfaces 33; 35 for the at least one valve disk 21. In FIG. 2, the throughflow orifices 17; 19 for the two throughflow directions are constructed differently. The cross section of the throughflow orifices is of secondary importance for the present invention. When FIGS. 2 and 3 are viewed together, it will be seen that the outer valve seat surface 33 is crescent-shaped. The crescent shape is achieved through the varying contour of the control edge. The control edge has a curved cross section in the half section on the left-hand side and a trapezoidal cross section in the half section on the right-hand side. Further, the spacing of the two control edges and valve seat surfaces, respectively, can change along the circumference. At the point of greatest distance between the two control edges, the hydraulic center of pressure on the underside of the valve disk 21 is also operative radially at the greatest distance from the valve disk center such that the valve disk 21 first lifts against the closing force when under hydraulic opening force in the area at constant pressure in the annular groove 27.

Figure 4:
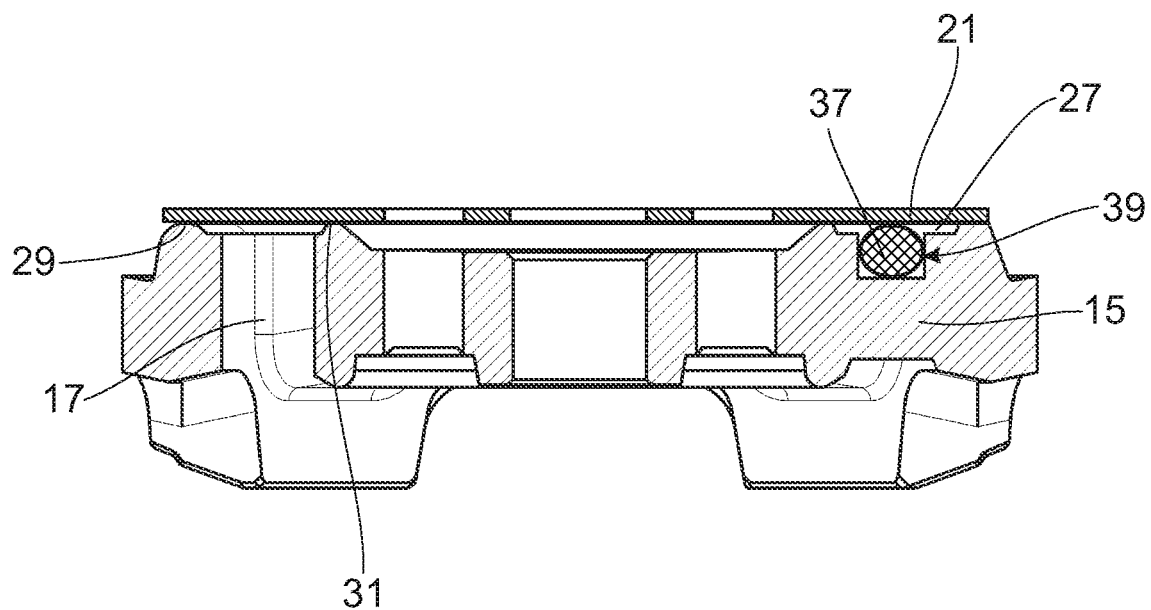
FIG. 4 is a sectional view according to FIG. 2.

FIG. 2 further shows a quantity of spring bodies, here elastomeric bodies 37 between the throughflow orifices and inside the annular groove 27, which elastomeric bodies 37 are formed at a distance from and therefore separately from the control edges 29; 31. FIG. 4 shows a cross section through the damping valve body 15 in the area of an elastomeric body 37 which is formed, e.g., in a barrel-shaped manner with a curved end face. The elastomeric bodies are preferably formed as balls because there is then no preferred installation position. The elastomeric body extends slightly above the level of the control edges 29; 31 and therefore exerts an opening force on the valve disk 21. A blind hole opening 39 for receiving the elastomeric body 37 is provided in the drawing. However, a direct vulcanized joint without an opening can also be provided.

Figure 5:
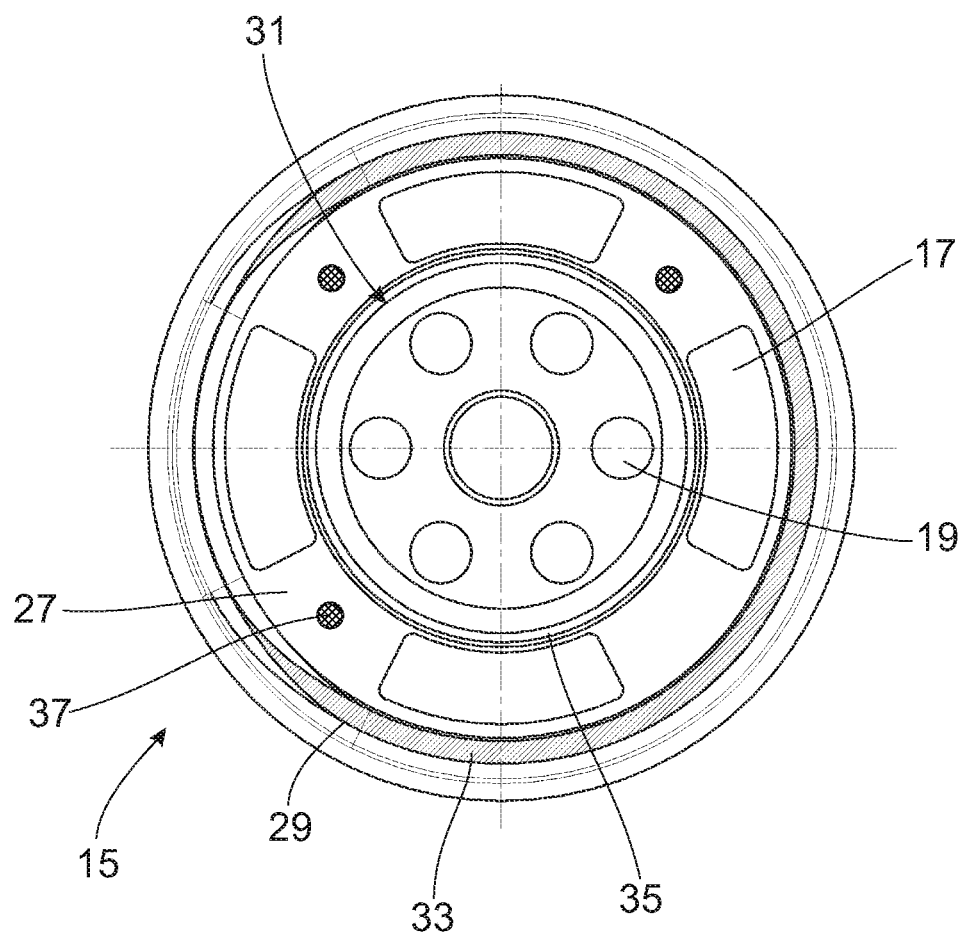
FIG. 5 is a top view of a damping valve with asymmetrical arrangement of the elastomeric bodies.

Referring to FIG. 5, the elastomeric body 37 can also be arranged asymmetrically in order to achieve a purposely one-sided opening force comparable to the function of the crescent-shaped valve seat surface 33. A comparable result can be achieved when the elastomeric bodies 37 have a variable opening force, for example, because of a different cross section, material selection or spring rate.

Figure 6:
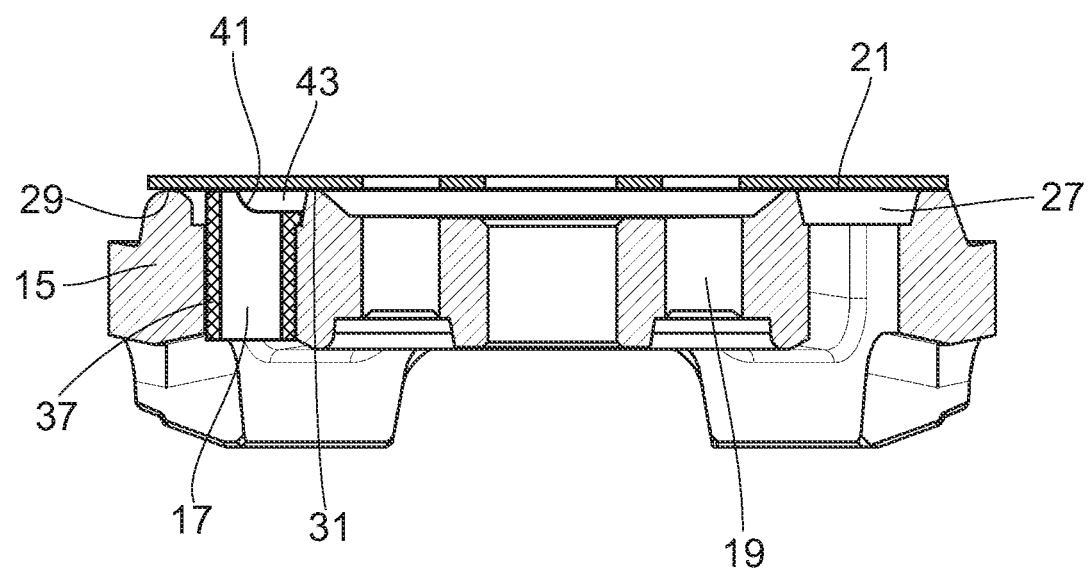
FIG. 6 is a sectional view of a damping valve with tubular elastomeric bodies.

FIG. 6 shows an embodiment based on FIG. 5. Differing from FIG. 5, the elastomeric body 37 is constructed as a tubular body which also forms the throughflow orifice 17. This variant can be introduced very easily in an already existing damping valve body 15 without undertaking changes to the damping valve body. In this case too, proceeding from the annular groove 27, the elastomeric body 37 is somewhat higher than the control edges 29; 31. However, an end face 41 of the elastomeric body 37 facing in direction of the valve disk 21 does not form a control edge because the elastomeric body 37 has a lateral opening which leads into the annular groove 27 and, consequently, just a ridge geometry contacts the valve disk.

Figure 7:
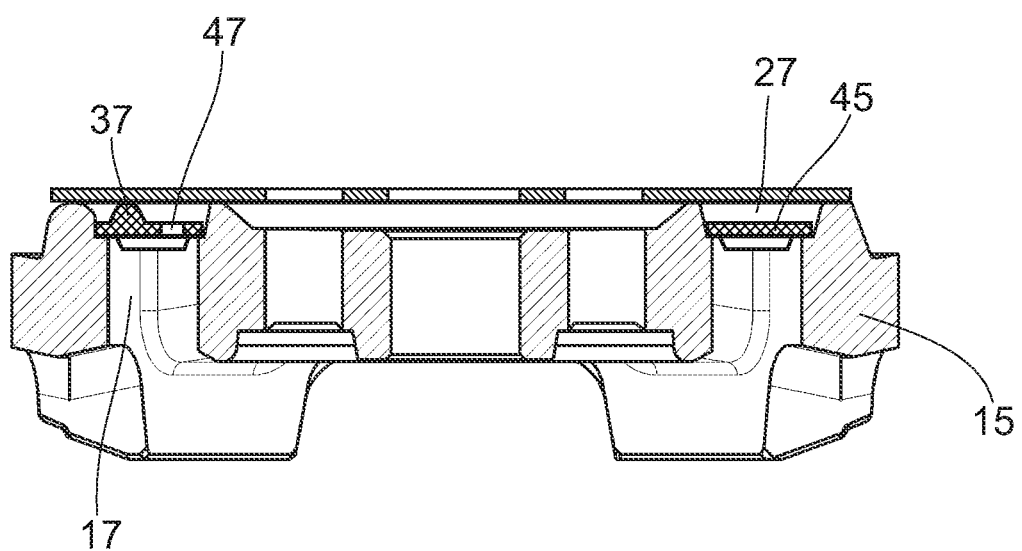
FIGS. 7 and 8 show elastomeric bodies as part of a pre-choke valve.

FIG. 7 shows a variant in which a plurality of elastomeric bodies 37 which are adjacent in circumferential direction are connected to one another via an elastomeric ring 45. The elastomeric ring 45 can extend over the entire circumference of the annular groove 27 but can also be limited to an angular segment. Additionally, the elastomeric ring 45 can also take over the function of a pre-choke when there are corresponding pre-choke orifices 47 which reduce the cross section of the throughflow orifices 17 in order, for example, to achieve a determined throughflow characteristic with a standardized damping valve body 15.

Figure 8:
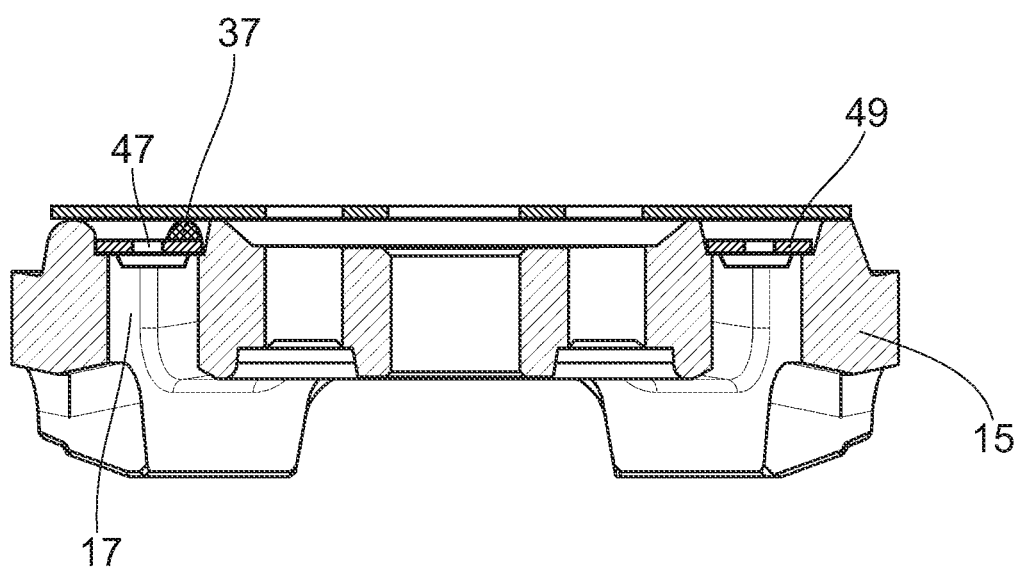

In the construction shown in FIG. 8, the pre-choke orifices 47 can be formed in a metallic ring 49 which also carries the elastomeric bodies 37. This variant can support particularly high loading and can be adapted particularly easily owing to the fact that the ring 47 and damping valve body 15 are constructed separately.

When a flow impinges on the valve disk 21 via the throughflow orifices 17, the entire annular groove 27 fills with damping medium. Accordingly, a hydraulic opening force acts on the valve disk 27. Starting from a closed damping valve position, the elastomeric bodies 37 exert their maximum mechanical opening force on the valve disk 21. If the opening force exceeds the closing force, the valve disk 21 lifts up from its valve seat surface 33. If the closing force on the valve disk 21 is greater than both opening forces, the valve disk 21 again occupies its closed position, and the closing movement of the valve disk is cushioned by the elastomeric bodies 37 until the valve disk 21 is seated again on the valve seat surface 33. An identical behavior would also be possible and useful for valve disk 23 in connection with the throughflow orifices 19.

Figure 9:
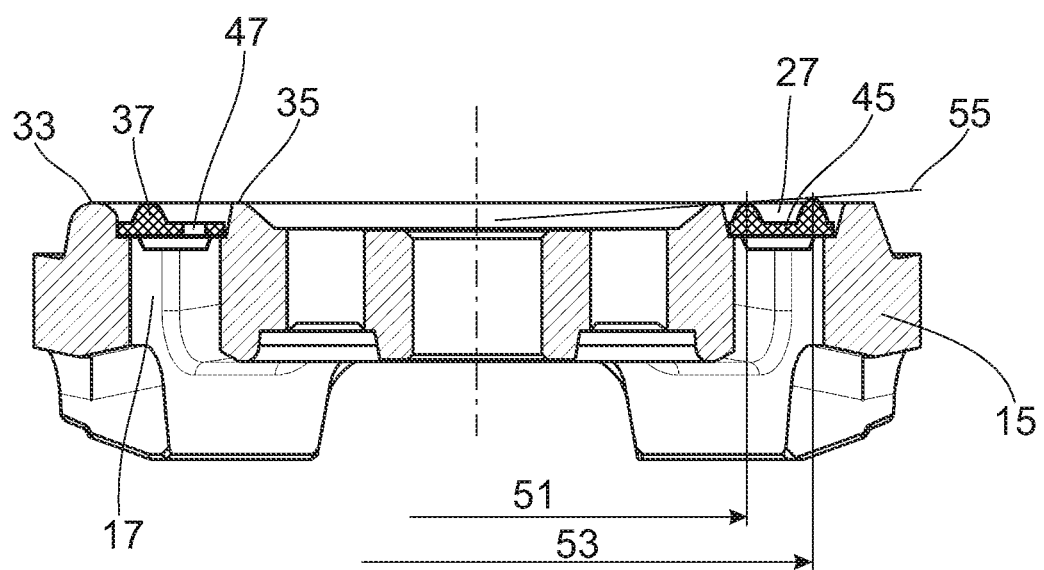
FIG. 9 is a sectional view of elastomeric bodies forming an oblique plane.

Referring to FIG. 9, the elastomeric body 37 can also be arranged on different pitch circles 51; 53. For example, the elastomeric bodies are connected to ring 45. However, an arrangement such as that shown in FIG. 2, for example, i.e., directly in the damping valve body, can also be provided. There is also the option that the elastomeric bodies form an oblique plane with reference to the valve seat surfaces 33; 35 so that, e.g., the elastomeric body on the larger pitch circle 53 projects out axially farther over the valve seat surface 33 than the elastomeric body 37 on the smaller pitch circle 51. In some cases it may also be useful for the elastomeric bodies on the larger pitch circle to have a lesser axial projection, e.g., if the valve disk should preferably lift primarily at the inner diameter.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A damping valve comprising:
   at least one valve disk having a closing force;
   a damping valve body having at least one throughflow orifice and a control edge which is at least partially covered by the action of the closing force of the at least one valve disk;
   at least one spring body exerting an opening force on the valve disk that is less than the closing force of the at least one valve disk, and wherein the at least one spring body is constructed as an elastomeric body separately from the control edge and the at least one elastomeric body is constructed as a ball.

2. The damping valve according to claim 1, wherein the at least one elastomeric body is directly connected to the damping valve body.

3. The damping valve according to claim 1, wherein the damping valve body has an annular groove defined by two spaced-apart control edges, and wherein the at least one elastomeric body is arranged in the annular groove.

4. The damping valve according to claim 2, wherein the damping valve body has a receiving opening for the at least one elastomeric body.

5. The damping valve according to claim 1, wherein the damping valve body comprises a pre-choke disk having pre-choke orifices, and wherein the pre-choke disk carries the at least one elastomeric body.

6. The damping valve according to claim 1, wherein the damping valve comprises a plurality of elastomeric bodies and wherein the elastomeric bodies are connected to one another via an elastomeric ring.

7. The damping valve according to claim 5, wherein the elastomeric ring comprises the pre-choke orifices.

8. The damping valve according to claim 1, wherein the elastomeric body is constructed as a tubular body forming the at least one throughflow orifice.

9. The damping valve according to claim 1, wherein the damping valve comprises a plurality of elastomeric bodies and wherein the elastomeric bodies have a variable opening force.

10. The damping valve according to claim 1, wherein the damping valve comprises a plurality of elastomeric bodies and wherein the elastomeric bodies have a variable spring rate.

11. The damping valve according to claim 3, wherein the damping valve comprises a plurality of elastomeric bodies and wherein the elastomeric bodies are arranged asymmetrically along the circumference of the annular groove.

12. The damping valve according to claim 1, wherein the damping valve comprises a plurality of elastomeric bodies and wherein the elastomeric bodies are arranged on different pitch circles.

13. The damping valve according to claim 12, wherein the elastomeric bodies form an oblique plane.

14. A damping valve comprising:
   at least one valve disk having a closing force;
   a damping valve body having at least one throughflow orifice and a control edge which is at least partially covered by the action of the closing force of the at least one valve disk;
   at least one spring body exerting an opening force on the valve disk that is less than the closing force of the at least one valve disk, and wherein the at least one spring body is constructed as an elastomeric body separately from the control edge, and the at least one elastomeric body is constructed as a ball, wherein the damping valve body comprises a pre-choke disk having pre-choke orifices, and wherein the pre-choke disk carries the at least one elastomeric body.

* * * * *